(12) United States Patent
Crowe

(10) Patent No.: US 11,026,458 B2
(45) Date of Patent: Jun. 8, 2021

(54) BLOW-MOLDED LOG ASSEMBLY FOR ELECTRIC FIREPLACES

(75) Inventor: Matthew Crowe, Chelsea (CA)

(73) Assignee: TWIN-STAR INTERNATIONAL, INC., Delray Beach, FL (US)

(*) Notice: Subject to any disclaimer, the term of this patent is extended or adjusted under 35 U.S.C. 154(b) by 0 days.

(21) Appl. No.: 13/489,903

(22) Filed: Jun. 6, 2012

(65) Prior Publication Data

US 2013/0330485 A1 Dec. 12, 2013

(51) Int. Cl.
| | | |
|---|---|---|
| A41G 1/00 | (2006.01) | |
| B29C 49/00 | (2006.01) | |
| A42B 3/04 | (2006.01) | |
| B29K 67/00 | (2006.01) | |
| B29C 49/48 | (2006.01) | |
| B29C 49/46 | (2006.01) | |

(52) U.S. Cl.
CPC .............. *A41G 1/007* (2013.01); *A42B 3/046* (2013.01); *B29C 49/00* (2013.01); *B29C 2049/4638* (2013.01); *B29C 2049/4897* (2013.01); *B29C 2795/007* (2013.01); *B29K 2067/003* (2013.01)

(58) Field of Classification Search
CPC ................................. F24C 7/004; F24S 10/02
USPC ........................................................ 40/428
See application file for complete search history.

(56) References Cited

U.S. PATENT DOCUMENTS

| | | | | |
|---|---|---|---|---|
| 1,432,942 A | * | 10/1922 | Zei et al. .......................... 40/428 |
| 1,719,622 A | * | 7/1929 | Price ................................ 40/428 |
| 1,827,941 A | * | 10/1931 | Gross .............................. 40/428 |
| 1,840,372 A | * | 1/1932 | Staude ............................. 40/428 |
| 3,526,984 A | * | 9/1970 | Nielsen et al. ................. 40/428 |
| 3,742,189 A | * | 6/1973 | Conroy et al. ................ 392/348 |
| 4,458,060 A | * | 7/1984 | Yamane ............... C08F 214/06 526/292.3 |
| 6,289,887 B1 | * | 9/2001 | Oliver, Jr. ............... F24C 3/006 126/41 R |
| 6,393,207 B1 | * | 5/2002 | Martin .................... F24C 7/004 362/806 |
| 7,234,255 B2 | * | 6/2007 | Peng et al. ...................... 40/428 |
| 8,136,276 B2 | | 3/2012 | O'Neill |
| 8,157,425 B2 | * | 4/2012 | Gutstein et al. ............. 362/392 |
| 2005/0086841 A1 | * | 4/2005 | Schroeter ................ F21S 10/04 40/428 |
| 2006/0101681 A1 | * | 5/2006 | Hess et al. ...................... 40/428 |
| 2008/0181588 A1 | * | 7/2008 | Gorby ..................... F24C 7/004 392/348 |
| 2010/0162600 A1 | * | 7/2010 | Betz et al. ...................... 40/428 |
| 2010/0299980 A1 | * | 12/2010 | Betz et al. ...................... 40/428 |
| 2011/0198279 A1 | * | 8/2011 | Carter ..................... C02F 1/002 210/464 |

(Continued)

*Primary Examiner* — Gary C Hoge
(74) *Attorney, Agent, or Firm* — McDonald Hopkins LLC

(57) ABSTRACT

A manufactured blow-molded log assembly created from a thermo-mold polymer that is shapable using a blow-molding process of inserting an ingot into a blow-molding tool and injecting heated gas into the ingot to substantially shape the ingot into the manufactured log. The log assembly may then be removed from the blow molding tool and painted. The log assembly can include one or more, but preferably, a plurality, of such manufactured logs. The process may be used to create a log assembly that includes multiple manufactured logs, connected together or produced separately and stacked or otherwise arranged to simulate the appearance of real logs, which can be positioned inside an electric fireplace.

28 Claims, 5 Drawing Sheets

(56) References Cited

U.S. PATENT DOCUMENTS

| | | | | |
|---|---|---|---|---|
| 2013/0031816 A1* | 2/2013 | Deng | .................... | F24B 1/1808 |
| | | | | 40/428 |
| 2013/0186597 A1* | 7/2013 | Clark | ........................ | F17C 1/06 |
| | | | | 165/104.19 |
| 2015/0253013 A1* | 9/2015 | Fulkerson | ............... | F24C 7/004 |
| | | | | 40/428 |

* cited by examiner

BLOW-MOLDED LOG ASSEMBLY FOR ELECTRIC FIREPLACES

FIELD OF THE INVENTION

The invention relates to a log assembly for an electric fireplace. More specifically, the invention relates to a manufactured log formable from a thermo-mold polymer.

BACKGROUND

Electric fireplaces have the structural appearance of a conventional, wood burning fireplace. Electric fireplaces may also simulate the operation of a conventional fireplace, providing heat and a simulated burning of wooden logs. Often, to simulate the look a conventional fireplace, artificial logs, which may be shaped like real logs, may be located within an electric fireplace. Traditionally, these artificial logs have been constructed using polyresins, vacuum-formed plastics, and styrofoam. However, when used to manufacture artificial logs, these materials require significant manufacturing resources to construct the logs, which results in increased production costs. Some of these materials also lack translucency, are not blow-moldable, or do not allow paint to bond well to their surfaces. Also, traditional artificial fireplace log assemblies may be heavy, increasing shipping and warehouse costs. What is needed is an electric fireplace log assembly created using blow-molding techniques and low cost materials to produce an artificial log set having a more realistic appearance in simulating the look of real logs. A further need exists for an electric fireplace log assembly that is easily producible on a large scale and simulates the appearance of wooden logs without being overly cumbersome.

SUMMARY

The present invention is an electric fireplace log assembly that is easily producible on a large scale and simulates the appearance of wooden logs without being overly cumbersome. The log assembly of the present invention may be produced using blow molding, a manufacturing process which may be scaled to cost effectively meet demand.

Accordingly, the invention features an electric fireplace log assembly that includes a thermo-mold polymer shapable using a blow molding process. The blow molding process may include inserting an ingot into a blow molding tool, the blow molding tool including an interior surface. The blow molding process may also include injecting heated gas into the ingot to position an outer surface of the ingot adjacent to the interior surface of the blow molding tool. The ingot may be substantially shaped into the log assembly. The log assembly may then be removed from the blow molding tool. The log assembly may be positionable in an electrical fireplace. In another aspect, the log assembly may be formed to resemble a plurality of logs.

In another aspect, the thermo-mold polymer may include polypropylene (PP), polypropylene terephthalate (PET), and/or polypropylene terephthalic ester (PETE).

In another aspect, the blow molding tool may be cast from a sculpture insert. The sculpture insert may substantially have the shape and dimensions of the log assembly to be created using the blow molding tool.

In another aspect, paint may be applied to the log assembly mechanically or by hand. The log assembly may be creatable using an automated formation and painting process to allow mass production of the log assembly. Paint may be applied to a log assembly formed to resemble a log, wherein the paint is applied such to increase the resemblance of the log assembly to the log.

A method is provided for creating a log assembly for an electric fireplace comprising inserting an ingot of a thermo-mold polymer into a blow molding tool. The blow molding tool may include an interior surface. The method may further comprise injecting heated gas into the ingot to position an outer surface of the ingot adjacent the interior surface of the blow molding tool, substantially shaping the ingot into the log assembly. The method may further comprise removing the log assembly from the blow molding tool. The log assembly may be formed to resemble a log. Additionally, the log assembly may be positionable in an electrical fireplace.

In another aspect, the method may further comprise creating a sculpture insert substantially having the shape and dimensions of the log assembly to be formed using the blow molding tool. The method may further comprise casting the blow molding tool from the sculpture insert.

In another aspect, the method may further comprise applying paint to the log assembly to enhance the appearance of the log assembly. The method may further comprise mechanically applying the paint to the log assembly. The method may also comprise applying the paint to the log assembly by hand.

In another aspect, the thermo-mold polymer of the method may include polypropylene (PP), polypropylene terephthalate (PET), and/or polypropylene terephthalic ester (PETE).

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
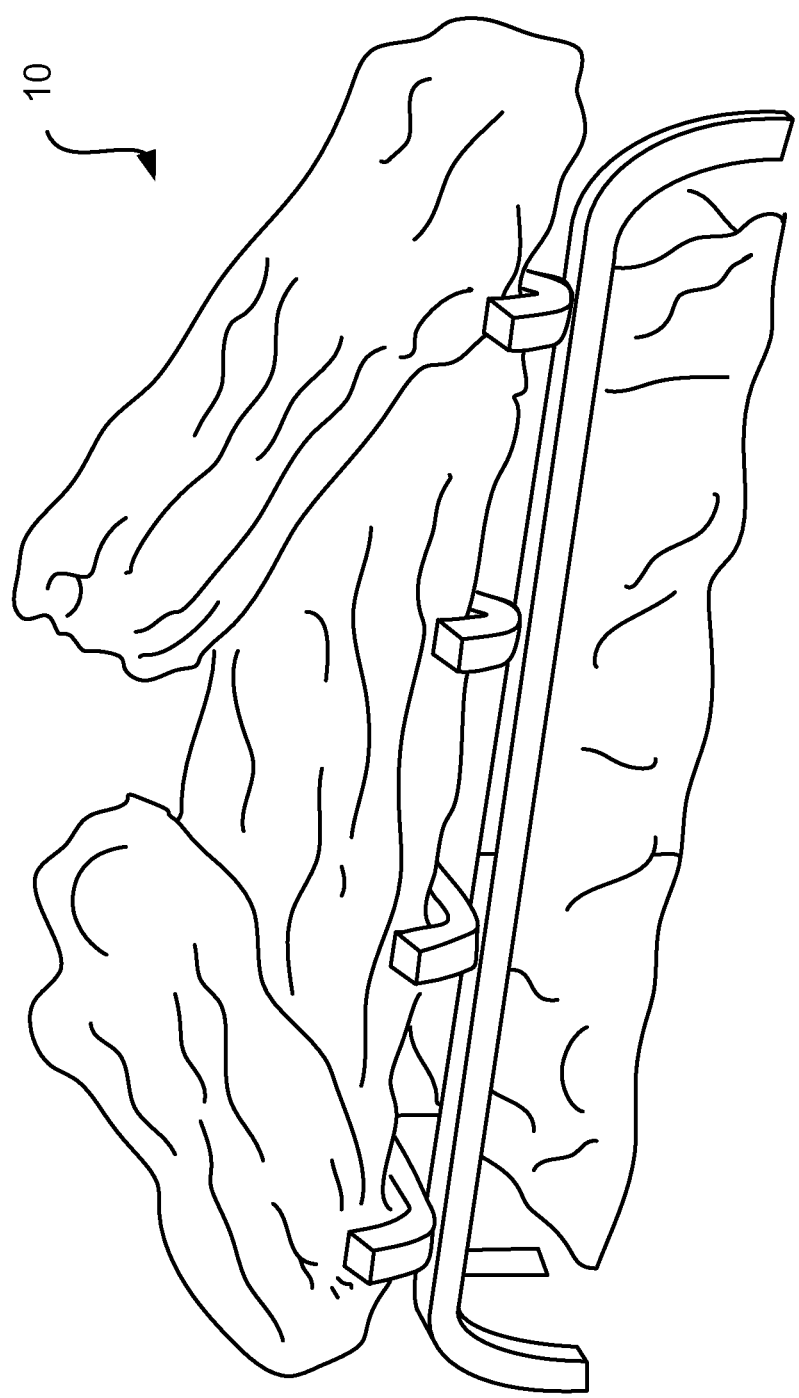
FIG. 1 is a front elevation view of a log assembly, according to an embodiment of the present invention.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention is not limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). Also, unless specifically stated otherwise, all embodiments included in this disclosure are intended to be usable with other embodiments disclosed herein.

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The present invention will now be described in detail with reference to embodiments thereof as illustrated in the accompanying drawings. Throughout this disclosure, the log assembly may be described as artificial logs, logs, or other like terms. Those of skill in the art will appreciate that mention of logs are intended to illustrate an embodiment of the present invention, and are not intended to limit the invention in any way.

The invention provides a log assembly locatable in an electric fireplace. The log assembly may resemble logs, such as wooden logs that could be burned in a conventional fireplace. However, a person of skill in the art will appreciate that log assemblies of other shapes and configurations may be used, without limitation. The log assembly may be formed using blow molding to alter the size and shape of a thermo-mold polymer. Additionally, the log assembly may be painted to enhance the resemblance of the log assembly to another object, such as one or more wooden logs.

Referring now to FIG. 1, an example of a log assembly 10 is illustrated. As seen in FIG. 1, the log assembly 10 may be shaped to resemble one or more logs. Embodiments that include multiple logs may be constructed using a log assembly 10 simulating a collection of logs, multiple log-shaped log assemblies 10 located adjacent to one another, or multiple log-shaped log assemblies 10 connected to one another. In the context of this disclosure, as log is to be understood as a usually bulky piece or length of a cut or fallen tree. Traditional logs used in wood burning fireplaces often acquire a charred appearance as the log is burned. This charred appearance may be simulated through the use of selected pigments added to a polymer, paint, or other forms of coloration.

As mentioned above, the log assembly 10 may include one or more simulated logs. The log assembly 10 may have a first end 22 and a second end 24, which may horizontally oppose each other. Desirably, the distance between the first and second ends 22, 24 should be less than the width of the electric fireplace in which the log assembly 10 may be located. Additionally, the log assembly 10 may include one or more simulated logs of similar and/or varying diameters. For example, the log assembly 10 may include simulated logs of varying diameters to create the appearance that the logs have been burned by different amounts.

The log assembly 10 may be formed by shaping a thermo-mold polymer in a molding tool. Preferably, the thermo-mold polymer will be resistant to deformation at the temperature an electric fireplace may be operated. The thermo-mold polymer may include polypropylene (PP). Using PP may be desirable to form the log assembly 10, due to its normally tough physical properties and melting point of between about 130° C. and 170° C., depending on the atactic material and crystallinity. With these melting points, PP may be easily formable using blow molding, but may also withstand the operational temperatures produced by the electric fireplace.

Additionally, the thermo-mold polymer may include polyethylene terephthalate (PET). Due to its semi-rigid to rigid properties, and higher melting point of about 250° C., PET may be easily formed using blow molding and adequately maintain its shape during operation in an electric fireplace. Additionally, since PET may be produced from recycled drink containers, PET supplies may be abundant. Similarly, the thermo-mold polymer may include polyethylene terephthalic ester (PETE). Similar to PET, thermo-mold polymers including PETE provide for adequately rigid properties and melting points of about 250° C. Those of skill in the art will appreciate that the aforementioned thermo-mold polymers may be used exclusively, partially in combination with one another, or in combination with another material that would be apparent after having the benefit of this disclosure. As such, the preceding list of polymers has been provided without the intent to limit the invention in any way.

As mentioned above, the log assembly 10 may be formed using blow molding, or a manufacturing process by which plastic parts are formed. With blow molding, an ingot of plastic, such as a thermo-mold polymer, may be formed to resemble the shape of a mold. To form the mold, a sculpture insert 10 may be created with the approximate dimensions and size of the log assemblies 10 to be produced by the mold. The mold may then be cast over the sculpture insert 10, such that an interior surface of the mold is approximately an inverse of the sculpture insert 10. The mold may then be included in a blow molding tool, which may be incorporated into a machine that may form thermo-mold polymers into log assemblies 10 with approximately the same dimensions, shape, and size as the sculpture insert 10.

Figure 2:
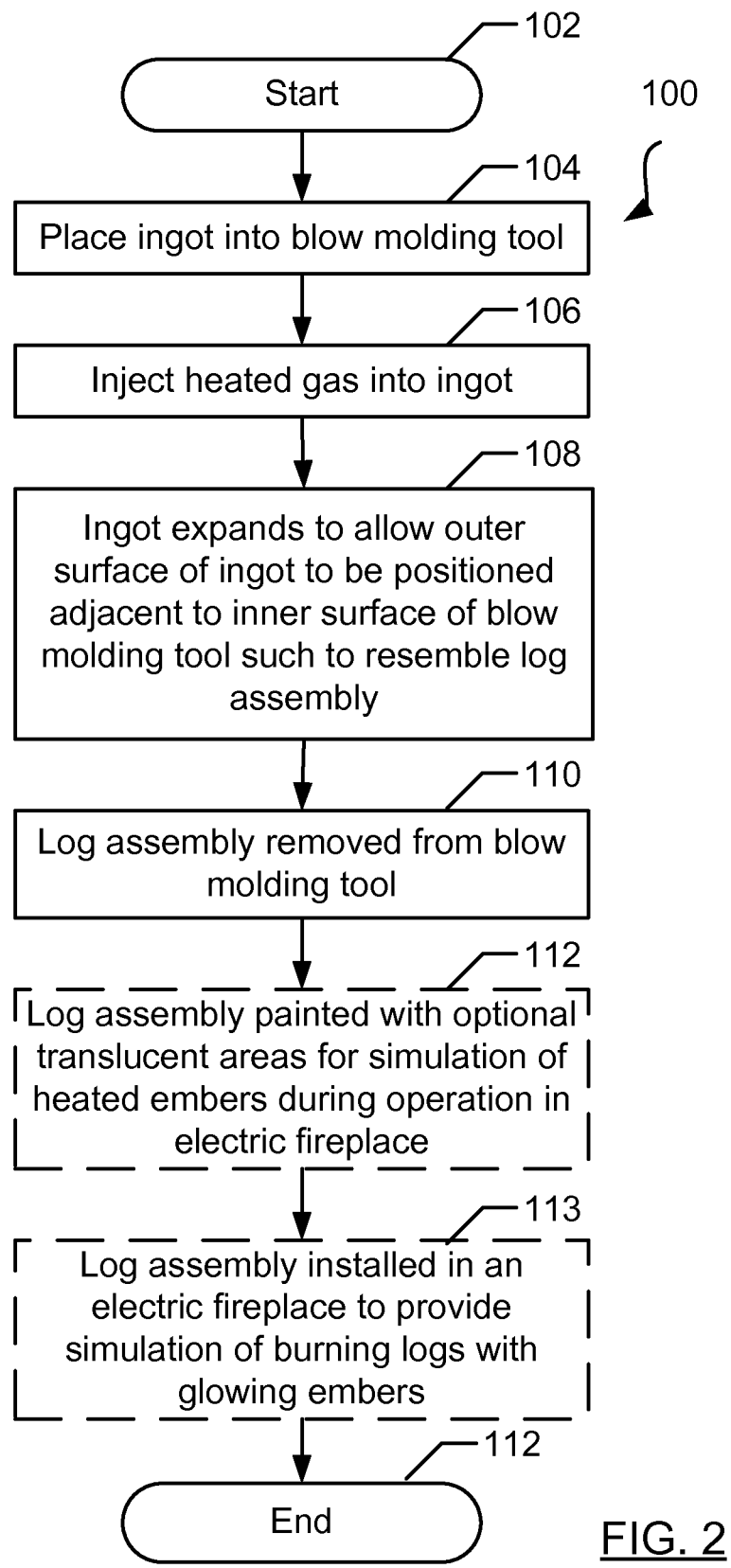
FIG. 2 is a flowchart illustrating the creation of a log assembly, according to an embodiment of the present invention.
Figure 3:
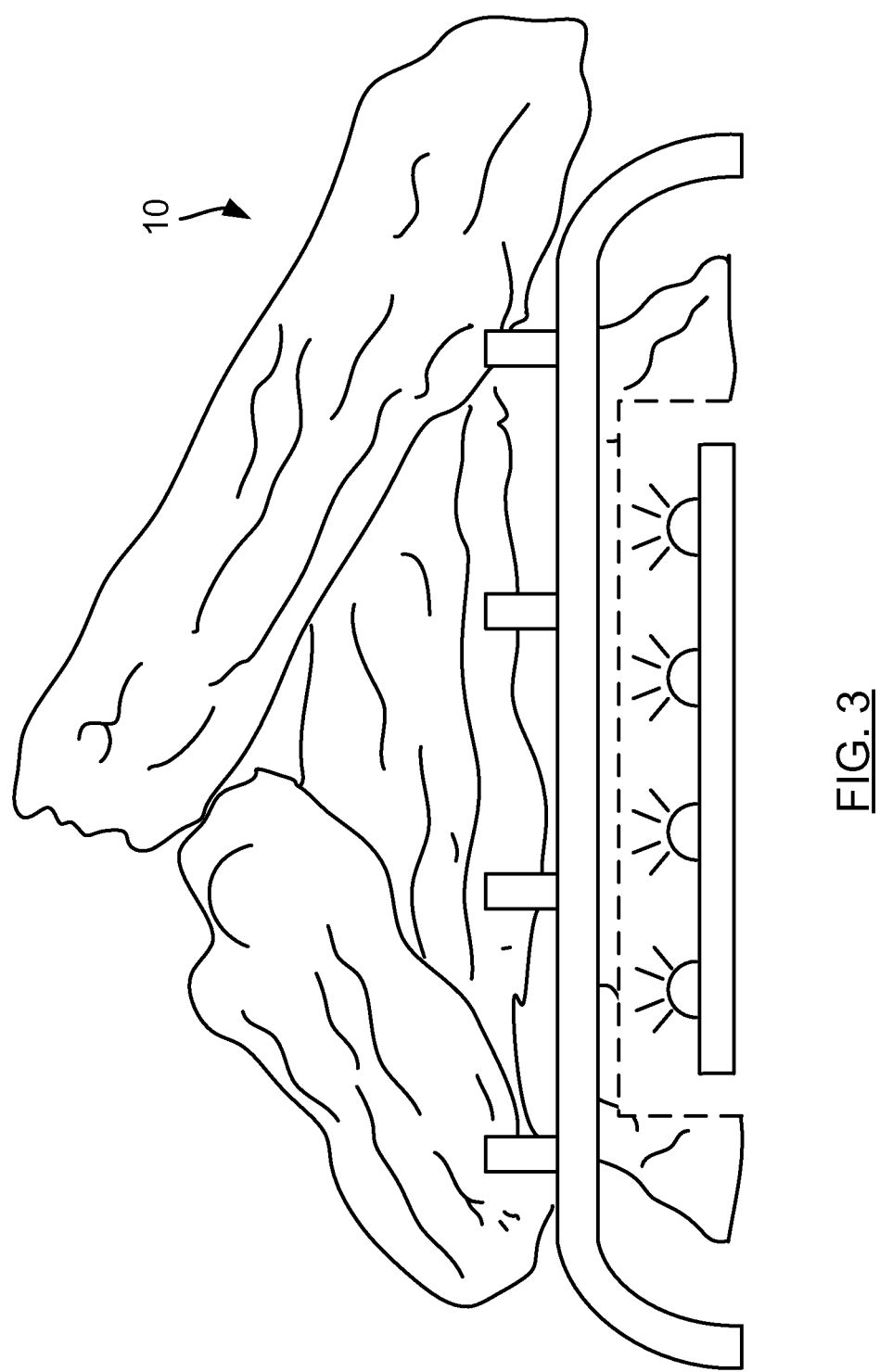
FIG. 3 is a side cut-away view of a light source installed below a log assembly, according to an embodiment of the present invention.
Figure 4:
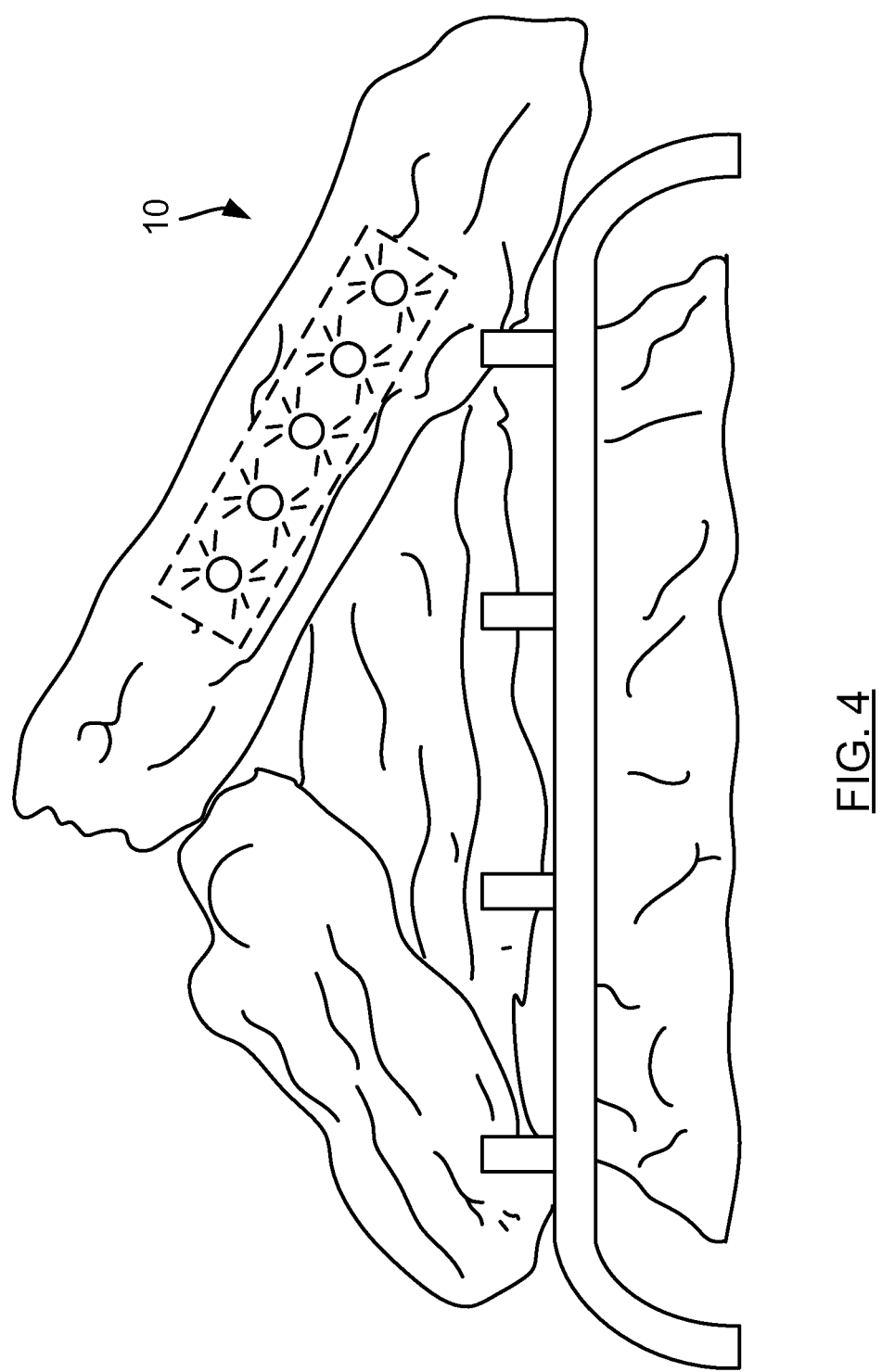
FIG. 4 is a side cut-away view of a light source installed inside a cavity of a log assembly, according to an embodiment of the present invention.
Figure 5:
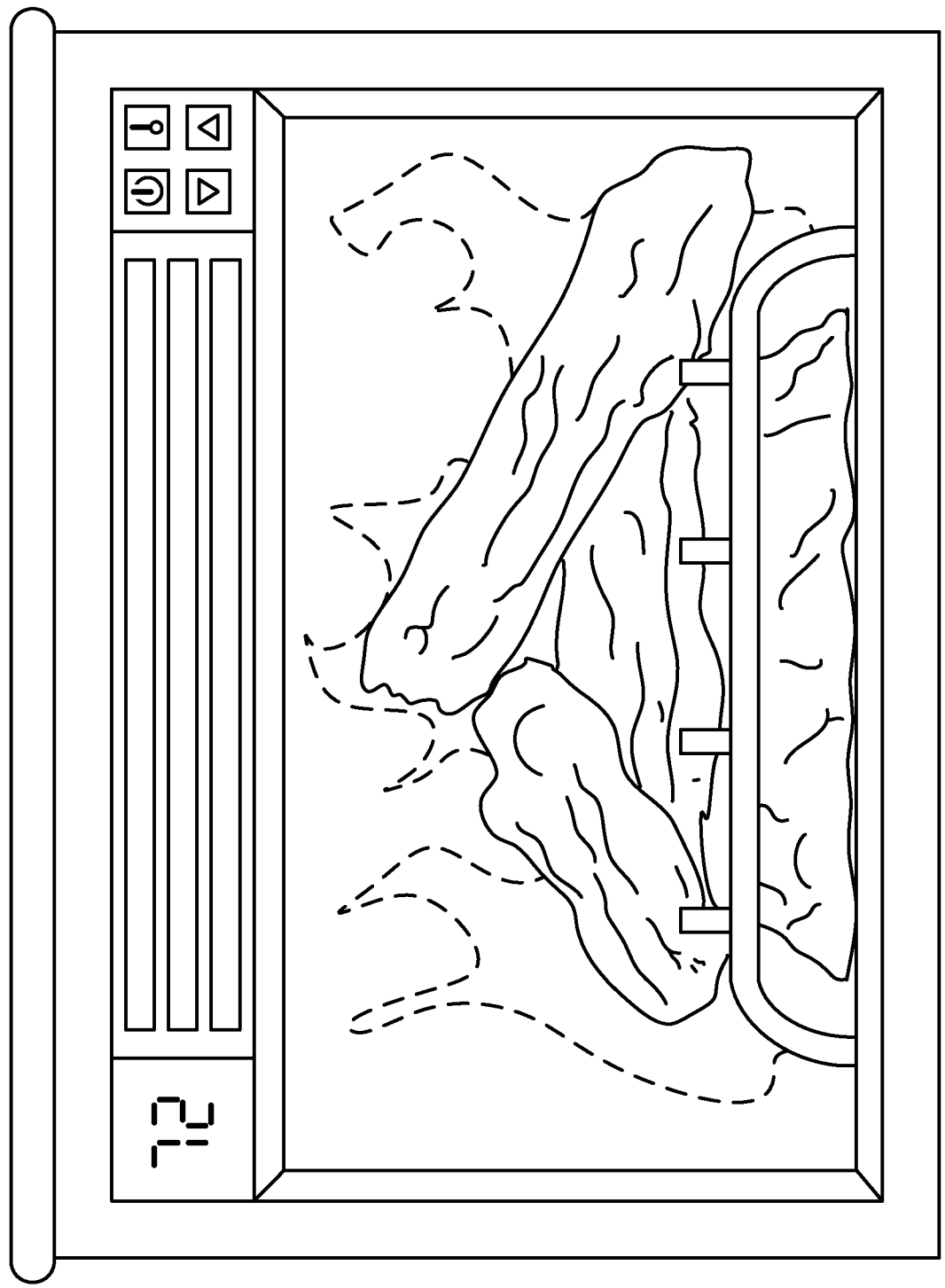
FIG. 5 is a perspective view of a log assembly and a logset sub-assembly installed inside a firebox of an electric fireplace, according to an embodiment of the present invention.

Referring now to flowchart 100 of FIG. 2, an illustrative process of blow molding, as it may apply to the present invention, will now be discussed. This illustrative process is provided in the interest of clarity, and is not intended to limit the present invention in any way. Starting at Block 102, an ingot of at least partially melted plastic, such as a thermo-mold polymer, may be inserted into a blow molding tool (Block 104). The ingot may include a hollowed center, and may resemble, for example, a shot glass or deflated balloon. A heated gas, such as hot air, may then be injected into the blow molding tool (Block 106). The heated gas may cause the partially melted ingot to expand, positioning the outer surface of the ingot adjacent to the inner surface of the blow molding tool (Block 108). As the ingot expands, its boundaries may conform to the inner surfaces of the mold, taking on the shape of the mold, i.e. the desired shape of the log assembly 10. Once the shape of the log assembly 10 has been formed, the log assembly 10 may be removed from the mold (Block 110). Optionally, the log assembly 10 formed from the blow molding tool may be painted (Block 112). Painting will be discussed in more detail below. The operation may then terminate at Block 114.

The above illustrative process of blow molding has been discussed in the interest of clarity, and should not be viewed to limit the present invention in any way. Those of skill in the art will appreciate additional processes of blow molding, such as extrusion blow molding, injection blow molding, and stretch blow molding. Additionally, a deformable die may be used to overcome potential problems with radial wall thickness, as will be appreciated by skilled artisans. To remove undesired leftover thermo-form polymer material, which may be created from the blow molding process, the formed log assemblies 10 may undergo trimming, such as spin trimming, to remove the unwanted polymer material. These additional processes of blow molding are intended to be included in this disclosure of the present invention without limitation.

As mentioned above, the log assembly 10 may be painted after it is removed from the blow molding tool. The log assembly 10 may be painted by hand or by utilizing a machine. If a machine is used to assist with the painting of the log assembly 10, the painting operation may be automated and/or integrated into an assembly line manufacturing process. One or more layers of paint may be applied to the log assembly 10 to mimic a desired look, such as the look of a log. In an embodiment where more than one layer is applied, one or more layers may be directed different portions of the surface of the log assembly 10. Also, some areas of the log assembly 10 may be painted to appear more opaque than others. This layering of paint layers may further increase the resemblance of the log assembly 10 to another object, such as a log or group of logs.

Once the log assembly 10 has been formed, it may then be located in an electric fireplace. The location of the log assembly 10 into the electric fireplace may be performed by hand or with the assistance of a machine. Once inserted in the electric fireplace, the log assembly 10 may provide an aesthetic appearance of a conventional fireplace without the inconvenience of open flames, burning embers, smoke, or other undesirable qualities of a conventional fireplace.

In an additional embodiment, the log assembly 10 may be formed using other processes of shaping a plastic, such as thermoforming, vacuum forming, injection molding, rotational molding, or other forms of plastics processing that would be apparent to a skilled artisan.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An electronic fireplace and a manufactured log assembly comprising:
an electric fireplace logset assembly comprising:
an artificial ember bed; and
a blow-molded log assembly comprising a thermo-mold polymer combination material comprising a combination of two or more thermo-mold polymers and at least one pigment, to provide a charred appearance of the manufactured log assembly, wherein the blow-molded log assembly comprises a radial wall having a generally homogenous wall-thickness, wherein the radial wall comprises a continuous exterior surface comprising an upper exterior surface free from apertures and operatively represents a plurality of stacked logs, wherein the manufactured log assembly is operatively and entirely or partially attached to the artificial ember bed, and wherein the radial wall is free of sharp edges.

2. The manufactured log assembly of claim 1, wherein the thermo-mold polymer combination is at least partially translucent when formed into the blow-molded log assembly.

3. The manufactured log assembly of claim 1, wherein the thermo-mold polymer combination comprises a surface, when formed into the blow-molded log assembly, that permits paint to bond to the exterior surface of the blow-molded log assembly.

4. The manufactured log assembly of claim 1, further comprising paint applied to the blow-molded log assembly.

5. The manufactured log assembly of claim 4, wherein the paint is applied via an automated painting process to allow mass production of the log assembly.

6. The manufactured log assembly of claim 1, further comprising paint applied to the blow-molded log assembly in layers of varying thicknesses.

7. The manufactured log assembly of claim 1, wherein the thermo-mold polymer combination comprises polypropylene and polyethylene terephthalic ester.

8. The manufactured log assembly of claim 1, wherein the thermo-mold polymer combination comprises polypropylene, polyethylene terephthalic ester, and one or more other thermo-mold polymers.

9. An electric fireplace log assembly comprising a thermo-polymer blow-molded log assembly that resembles a real log, the log assembly comprising one or more layers of paint, wherein the log assembly comprises a thermo-mold polymer combination comprising a combination of two or more thermo-mold polymers, wherein the thermo-mold polymer combination further comprises at least one pigment, to provide a charred appearance of the log assembly, and
wherein the thermo-polymer blow-molded log assembly is formed as a single unit and comprises a radial wall having a generally homogenous wall-thickness, wherein the radial wall comprises an upper exterior surface free from apertures, and wherein the log assembly is configured to entirely or partially attach to an artificial ember bed.

10. The electric fireplace log assembly of claim 9, wherein the log assembly comprises a first area having a first number of layers of paint, and a second area having a second number of layers of paint, wherein the first number and second number are different.

11. The electric fireplace log assembly of claim 9, wherein the thermo-mold polymer combination comprises polypropylene and polyethylene terephthalic ester.

12. The electric fireplace log assembly of claim 9, wherein the thermo-mold polymer combination comprises polypropylene, polyethylene terephthalic ester, and one or more other thermo-mold polymers.

13. An electric fireplace and manufactured log assembly comprising a plurality of artificial blow-molded logs created from a thermo-mold polymer combination that is shapeable using a blow-molding process, wherein the artificial blow-molded log assembly comprises a length that is generally less than a length of the electric fireplace and is positionable in a firebox of the electric fireplace, wherein the thermo-mold polymer combination comprises a combination of two or more thermo-mold polymers and pigment to provide a charred appearance of the manufactured log assembly, wherein the plurality of artificial blow-molded logs comprise radial walls having a generally uniform wall-thickness and an upper exterior surface free from apertures such that the upper exterior surface has a continuous front exterior surface, and wherein the plurality of artificial blow-molded logs assembly is configured to entirely or partially attach to the artificial ember bed.

14. The electric fireplace and manufactured log assembly of claim 13, wherein the plurality of artificial blow-molded logs are connected together as a single unitary piece.

15. The electric fireplace and manufactured log assembly of claim 13, wherein the plurality of artificial blow-molded logs is created as separate unitary pieces operatively attached to one another.

16. The electric fireplace and manufactured log assembly of claim 13 wherein the log assembly is at least partially translucent and comprises a plurality of painted and translucent portions.

17. The electric fireplace and manufactured log assembly of claim 16, wherein the log assembly comprises a cavity.

18. The electric fireplace and manufactured log assembly of claim 17, wherein the log assembly comprises a light source installed inside the cavity for transmitting light through the plurality of translucent portions so as to be visible to a viewer.

19. The electric fireplace and manufactured log assembly of claim 16, wherein the log assembly is hollow and comprises an open bottom.

20. The electric fireplace and manufactured log assembly of claim 19, wherein the electric fireplace comprises a light source installed below the log assembly so that light produced by the light source is transmitted into the open bottom of the log assembly and through the plurality of translucent portions.

21. The manufactured log assembly of claim 13, wherein the electric fireplace further comprises at least one of a fireplace grate or fireplace andirons.

22. The manufactured log assembly of claim 21, wherein the log assembly is entirely or partially attached to the fireplace grate and fireplace andirons.

23. The manufactured log assembly of claim 13, wherein the thermo-mold polymer combination comprises polypropylene and polyethylene terephthalic ester.

24. The manufactured log assembly of claim 13, wherein the thermo-mold polymer combination comprises polypropylene, polyethylene terephthalic ester, and one or more other thermo-mold polymers.

25. A manufactured log assembly comprising:

a blow-molded body comprising a thermo-mold polymer combination comprising a combination of two or more thermo-mold polymers, wherein the thermo-mold polymer combination comprises at least one pigment to provide a charred appearance of the manufactured log assembly, wherein the blow-molded body of the manufactured log assembly comprises a radial wall that is free of sharp corners and comprises a generally uniform radial wall thickness and a single blow-molded upper exterior surface free from apertures, wherein the manufactured log assembly is configured to entirely or partially attach to an artificial ember bed, wherein the thermo-mold polymer combination is shapeable using a blow-molding process.

26. The manufactured log assembly of claim 25, wherein the thermo-mold polymer combination comprises polypropylene and polyethylene terephthalate, wherein the polyethylene terephthalate comprises recycled polyethylene terephthalate.

27. The manufactured log assembly of claim 25, wherein the thermo-mold polymer combination comprises polypropylene and polyethylene terephthalic ester.

28. The manufactured log assembly of claim 25, wherein the thermo-mold polymer combination comprises polypropylene, polyethylene terephthalic ester, and one or more other thermo-mold polymers.

* * * * *